(12) United States Patent
Sahu et al.

(10) Patent No.: US 7,733,421 B1
(45) Date of Patent: Jun. 8, 2010

(54) VECTOR INTERPOLATOR

(75) Inventors: Shilpi Sahu, Bangalore (IN); Nikhil Balram, Mountain View, CA (US)

(73) Assignee: Marvell International Ltd. (BM)

(*) Notice: Subject to any disclaimer, the term of this patent is extended or adjusted under 35 U.S.C. 154(b) by 1132 days.

(21) Appl. No.: 11/294,709

(22) Filed: Dec. 5, 2005

(51) Int. Cl.
*H04N 7/01* (2006.01)
*H04N 11/20* (2006.01)

(52) U.S. Cl. .......... 348/452; 348/451; 348/699; 348/448; 348/441; 382/300

(58) Field of Classification Search .......... 348/452, 348/451, 699, 702, 448, 441, 431.1, 402.1; 375/240.16, 240.13; 382/236, 300; 345/606
See application file for complete search history.

(56) References Cited

U.S. PATENT DOCUMENTS 5,886,745 A * 3/1999 Muraji et al. ............ 348/448

* cited by examiner

*Primary Examiner*—M. Lee
*Assistant Examiner*—Jean W Désir

(57) ABSTRACT

A vector interpolator optimizes the conversion of an interlaced signal to a non-interlaced signal. The vector interpolator improves the visual clarity of slanted features in a displayed image by adjusting the luminance value of each pixel such that the appearance of "steps" or "jaggies" in the features is reduced. For each pixel, the vector interpolator determines a similarity measure for the pixels within a predetermined area around the pixel. From the similarity measure, an angle for interpolation is selected. The luminance value is then interpolated along the selected vector corresponding to the angle and applied to the pixel.

18 Claims, 5 Drawing Sheets

VECTOR INTERPOLATOR

FIELD OF THE INVENTION

The present invention generally relates to signal processing applications. More particularly, the present invention is related to a circuit, system, and method for a vector interpolator that provides pixel interpolation for spatial de-interlacing or scaling.

BACKGROUND

The formats selected for displaying video data have changed over time along with the supporting technologies for displaying the video in these formats. Many, if not most, currently used displays are interlaced due to type of programming available. Interlaced displays render alternate lines of the video every field. Interlacing alternates between drawing the even-numbered lines and the odd-numbered lines of each frame. However, interlaced displays are giving way to high definition progressive televisions.

Progressive or non-interlaced scanning is a method for displaying, storing or transmitting moving images in which the lines of each frame are drawn in sequence. Modern progressive scan displays do not suffer as much from line flicker or scan line visibility in comparison to interlaced displays. These advantages are more pronounced when the size of the display is large or when the screen is viewed from close proximity. However, despite the greater acceptance and use of progressive displays, much of the video material available for viewing or broadcasting is still in the interlaced standard definition format. To display an interlaced picture on a progressive display, the video may be converted to progressive format through a line-doubler or a de-interlacer. However, many line-doublers used as de-interlacers introduce display artifacts that reduce the quality of the video being displayed.

BRIEF DESCRIPTION OF THE DRAWINGS

Non-limiting and non-exhaustive embodiments are described with reference to the following drawings.

DETAILED DESCRIPTION OF THE PREFERRED EMBODIMENT

Figure 1:
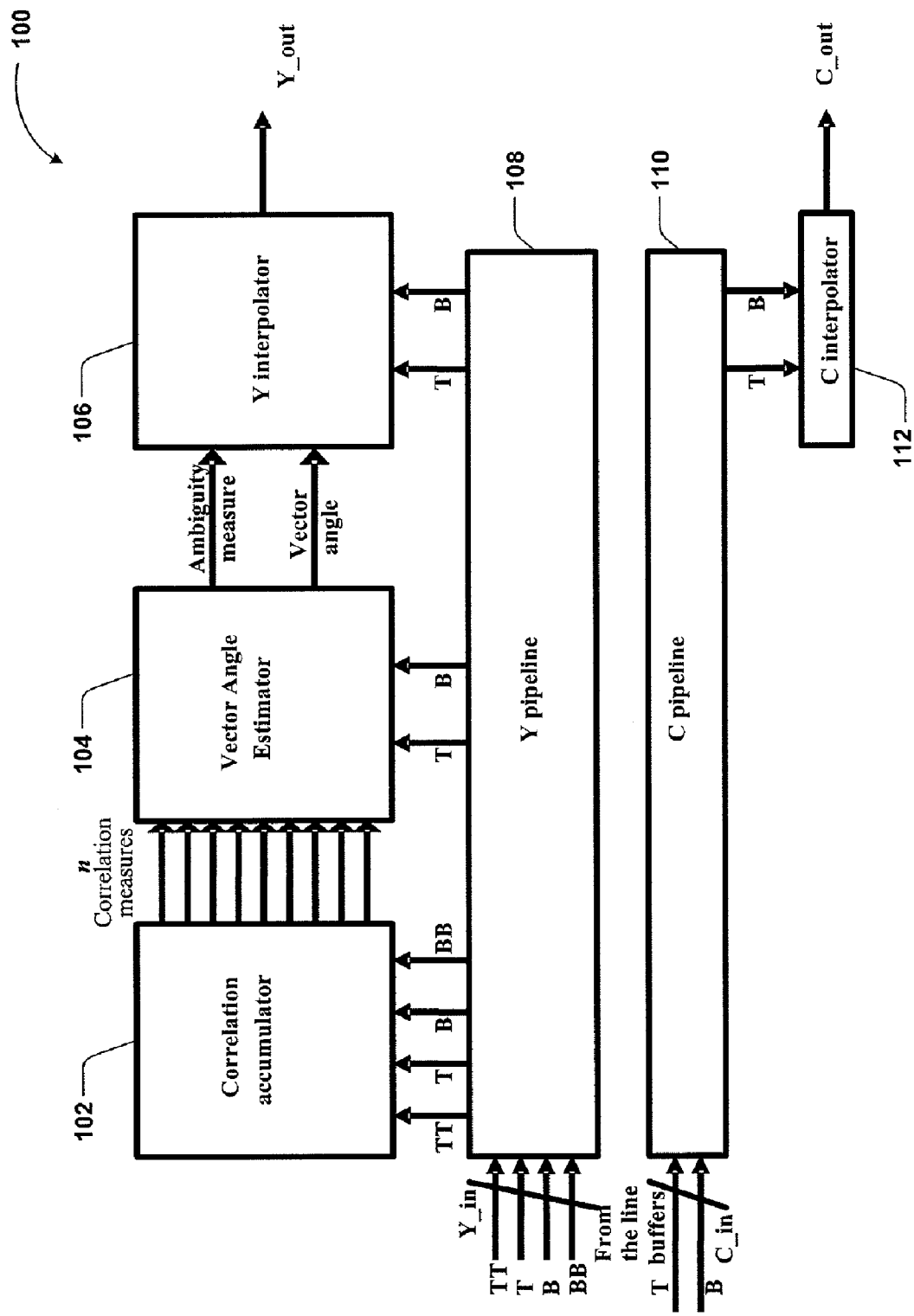
FIG. 1 illustrates a functional block diagram of an exemplary vector interpolator.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, a vector interpolator optimizes the conversion of an interlaced signal to a non-interlaced signal. The vector interpolator improves the visual clarity of slanted features in a displayed image by adjusting the luminance value of each pixel such that the appearance of "steps" or "jaggies" in the features is reduced. For each pixel, the vector interpolator determines a similarity measure for the pixels within a predetermined area around the pixel. From the similarity measure, an angle for interpolation is selected. The luminance value is then interpolated along the selected vector corresponding to the angle and applied to the pixel.

When a video display is de-interlaced, the scan line visibility is reduced due to the doubling the number of lines. The vector interpolator described herein improves the line-doubling process by interpolating the luminance values for the pixel from the surrounding pixels. As stated, by interpolating along a selected angle from the pixel to be generated, a more accurate luminance value is applied to the pixel. This method contrasts with doubling of lines by vertical interpolation, where the values applied to a newly generated pixel are interpolated from the pixels directly above and below the position for the new pixel. Doubling the lines by vertical interpolation gives rise to steps or "jaggies" in slanted features because the pixels directly above and below the pixel to be generated may not accurately reflect the display that should be provided for the newly generated pixel. Also, line flicker is not reduced by simple vertical scaling of the image. Therefore, the de-interlacer provided in conjunction with the vector interpolator described herein uses frame/field stores for 3-dimensional adaptive de-interlacing. A 3-D adaptive de-interlacer computes motion between the fields. When there is substantial motion between fields, spatial or intra-field de-interlacing is turned on and when there is no motion between fields, temporal or inter-field de-interlacing is turned on. In case of intermediate values of motion, output is a blend of the two kinds of de-interlacing. 3-D de-interlacing gets rid of line flicker in stationary areas of video, but the "jaggie" problem persists. These artifacts may be reduced by using the intelligent vector interpolator described herein. The vector interpolator computes the direction of the vectors and interpolates the pixel values in that direction. Using the vector interpolator produces a smooth progressive frame when motion content of the frame is high. The vector interpolator uses an area-efficient methodology with a number of controllable heuristics to compute the luminance value of the missing pixel along the direction of the edge passing through the missing pixel position.

Although the discussion herein refers to interpolating a luminance value for the pixel to be generated, the vector interpolator may be used to interpolate other values for the pixel as well (e.g., chrominance value and the like).

FIG. 1 illustrates a functional block diagram of an exemplary vector interpolator, in accordance with the discussion herein. The vector interpolator (100) includes a correlation accumulator (102), a vector angle estimator (104), a Y interpolator (106), a Y pipeline (108), a C pipeline (110), and a C interpolator (112).

For the embodiment of FIG. 1, the correlation accumulator (102) and the vector angle estimator (104) are included in the interpolation process for the luminance value (Y_out) of pixels to be generated. In contrast, the determination of the chrominance value (C_out) does not include these modules in its interpolation process with only the chrominance pipeline (110) and the chrominance interpolator (112). The luminance (Y) is interpolated by estimating the orientation of a luminance vector passing through the pixel to be generated first. Chrominance, however, is determined by plain vertical averaging. Chrominance in a video frame has lower bandwidth (e.g., 0.6-1.3 MHz) as opposed to luminance bandwidth (e.g., 4.2 MHz) and does not contain very sharp transitions. Accordingly, plain vertical interpolation for chrominance doesn't result in any visible artifacts similar to the "jaggies" that result due to inaccurate selection of a luminance values for pixels to be generated. Although, there is a difference for handling chrominance and luminance in the embodiment shown, other embodiments may be used where chrominance is also interpolated by the method described herein for estimating the vector angle.

In operation, the Y pipeline (108) receives the luminance data (Yin) for each line of a window around a pixel used for estimating the pixel's luminance value. In the example shown, four lines of data are input into the vector interpolator (100) that correspond to a top available line (T) (just above the missing pixel), a bottom available line (B) (just below the missing pixel), a second top available line (TT), and a second bottom available line (BB). This data is distributed by the Y pipeline (108) to the other modules for interpolating the luminance value for the pixels. When determining the "correlation" factor for the pixel to be determined, the vector interpolator (100) finds the region of similarity about the pixel. The term "correlation" is used here to define a similarity measure, which in the embodiments given here is defined such that lowest value represents greatest similarity. The pixel luminance value is found by interpolating along the region of similarity. For example, a pixel belonging to the line immediately above the missing line to be generated, and a pixel belonging to the line below may be used to interpolate the luminance value for the pixel. Any given pixel value in the missing line is calculated by averaging the pixels above and below, even if these pixels are not directly above and below the pixel to be generated. The vector interpolator (100) selects the interpolating pairs according to the direction of the vector passing through the missing pixel position (See FIG. 2). The correlation accumulator (102) and vector angle estimator (104) are used to gather the pixel data and select the vector to be used for the interpolation.

Figure 2:
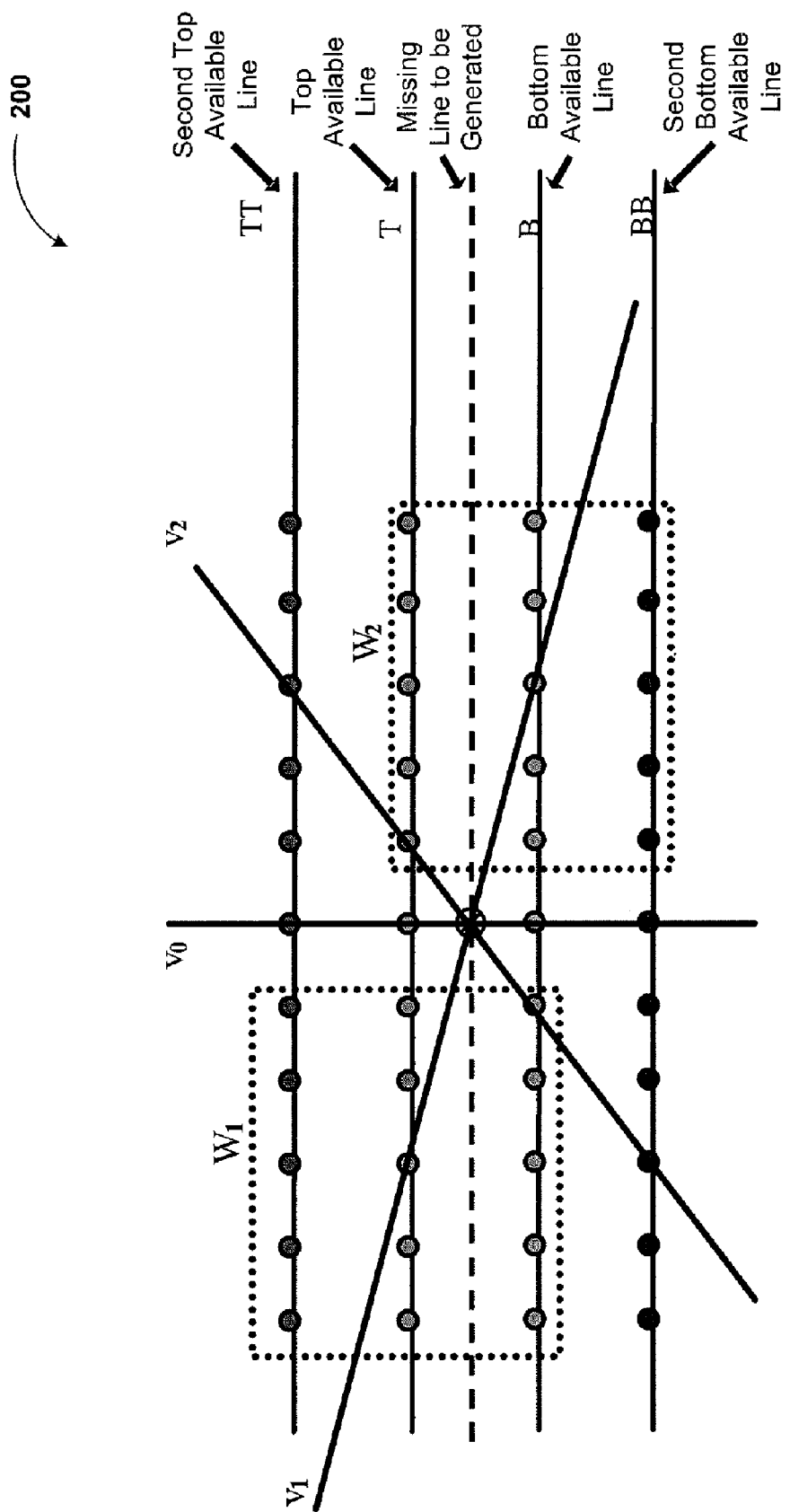
FIG. 2 illustrates an exemplary pixel graph that includes possible vectors for use in interpolating values for the pixel to be generated.

The correlation accumulator (102) computes a set of values reflecting the similarity of pixels along different directions around the missing pixel. A window of pixels is selected around the missing pixel. In FIG. 2, a window of 11×4 pixels around the missing pixel is shown. The direction of the vector inside this window is determined by matching the pixels surrounding the pixel whose luminance value is to be determined. When pixels match, the match usually corresponds to a feature that is passing through those pixels (e.g., a line). For example, line $v_0$ is the vector corresponding to vertical features, $v_1$ is one of the possible vectors corresponding to a left slanted feature and $v_2$ corresponds to a right slanted feature. Similarity or correlation in the direction $v_1$ is found by summing the absolute differences of the luminance values of the corresponding pixels in sub-windows $W_1$ and $W_2$ shown in FIG. 2.

$$\text{Corr}_1 = \Sigma abs(W_1(i,j) - W_2(i,j)) \quad \text{(Eqn 1)}$$

A low correlation value indicates good similarity between regions $W_1$ and $W_2$ and high value indicates that the two regions are dissimilar. The correlations for each of the possible angles in the window formed around the missing pixel are computed. For example, in FIG. 2, with 5×3 sub-windows for calculating correlations, the number of possible angles is seven with the vectors $v_0$, $v_1$, and $v_2$ corresponding to just three. Usually, the position corresponding to the minimum correlation value (highest match) among the correlations calculated in the window results in a best possible estimate for the feature direction.

The number of correlation values is dependent on the window length selected and the sub-window length selected. Increasing the window size increases the number of possible angles vectors that can pass through the missing pixel, but also increases computational complexity and possibility of making mistakes in vector angle judgment. Selecting smaller sub-windows increases the number of angles inside a window of given size and also detect small features, but then $W_1$ and $W_2$ of FIG. 2 end up being determined as dissimilar so that their correlations are not reliable anymore and might be noisy. Accordingly, the window and sub-window sizes are carefully selected to get good angle coverage, detect sharp and small features and avoid picking up noise or spurious features.

The vector angle estimator (104) takes the similarity or correlation measures from the correlation accumulator (102) and determines the vector angle for interpolating the luminance of the pixel to be generated. In addition to selecting the angle, the vector angle estimator (104) may also provide a measure of confidence, or ambiguity measure, associated with the estimated vector direction. An exemplary process for making the angle estimation is provided below in the discussion of FIG. 4.

Once the angle of interpolation is known, the vector angle and the ambiguity measure are passed to the luminance (Y) interpolator (106). The Y interpolator (106) calculates the luminance values of pixels in the missing line by averaging the luminance values of the pixels along the vector angle selected. However, if the ambiguity measure associated with the calculated angle vector is large, the vertical pixels, used for vertical interpolation, may be selected. The final luminance value (Y_out) of the pixel is a weighted average between the vertically averaged value and the value calculated along the angle vector, the weighting factor being the ambiguity measure associated with the angle vector.

FIG. 2 illustrates an exemplary pixel graph that includes possible vectors for use in interpolating values for the pixel to be generated, in accordance with the present disclosure. Windows ($W_1$, $W_2$) correspond to vector $v_1$. It is the pixel luminance values of these windows ($W_1$, $W_2$) that are averaged to help estimate the luminance value of the pixel to be generated.

In the example shown, four lines of data are used in the interpolation that correspond to a top available line (T) (just above the missing pixel), a bottom available line (B) (just below the missing pixel), a second top available line (TT), and a second bottom available line (BB). The lines of data correspond to a selection made for the window size that surrounds the pixel to be generated. The four lines of data correspond to the 11×4 window used. The sub-windows ($W_1$, $W_2$) correspond to 5×3 selections of pixels that have their luminance values averaged to determine a luminance value for the pixel to be generated.

Figure 3:
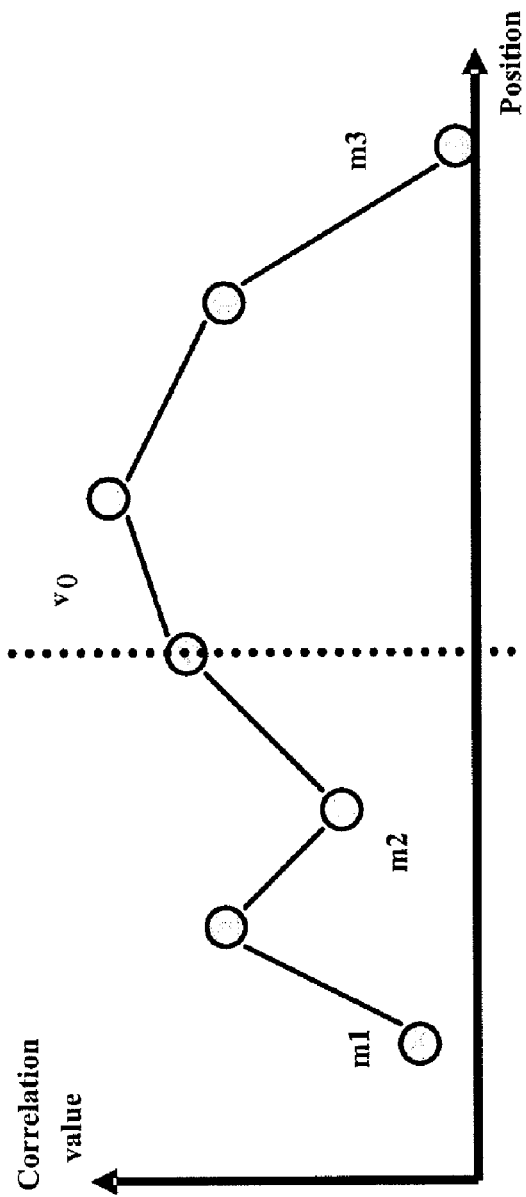
FIG. 3 illustrates a graph of a sample correlation profile for window surrounding a pixel to be generated.

FIG. 3 illustrates a graph of a sample correlation profile for window surrounding a pixel to be generated, in accordance with the present disclosure.

As previously stated, it is the minimum values of correlation that indicate the greater similarity of pixel values in that vector's direction. Often, however, correlation profiles may indicate more than one minimum. In that case, the deepest minimum position, or lowest correlation value is determined to correspond to the vector angle selection for interpolation. However, small features in the video such as thin parallel lines running at an angle, hair, window grates, and the like may give rise to complicated correlation profiles where even the deepest minimum does not match with the actual correct angle for interpolation. So, all the correlation minima values and positions are computed from the set of correlations and passed on to the next step for further processing.

The correlation profile of FIG. 3 includes three minima (m1, m2, m3). By visual inspection, m3 appears to be the deepest minima. However, m3 is furthest from the missing pixel to be computed and therefore is less reliable than m2. The minimum at m2 is closer than m1 and m3, but is not as deep. The heuristics for selecting which minima corresponds to the eventually selected vector angle, is a matter of selection of which rule to apply. In one example however, one rule may be that the minimum should be closest to the center. Selecting the minimum closest to the center, results in a decreased possibility of making an error. Farther minima angles get selected when there aren't any minima closer to the center.

Another rule may correspond to a determination that a chosen minimum is not very shallow. Noise or minor variations in the luminance value of the window can cause spurious minima. The threshold for rejecting shallow minima can be the mean of all the correlation values.

Furthermore, additional heuristics are used to determine reliability of chosen minima position. After the direction for interpolation is chosen, the direction may still not be correct. The additional heuristics indicate the reliability or robustness of the selection. The measure obtained by these rules is represented as an ambiguity metric and used to balance between the vertically averaged luminance value and the luminance value calculated by interpolating along the chosen direction.

Figure 4:
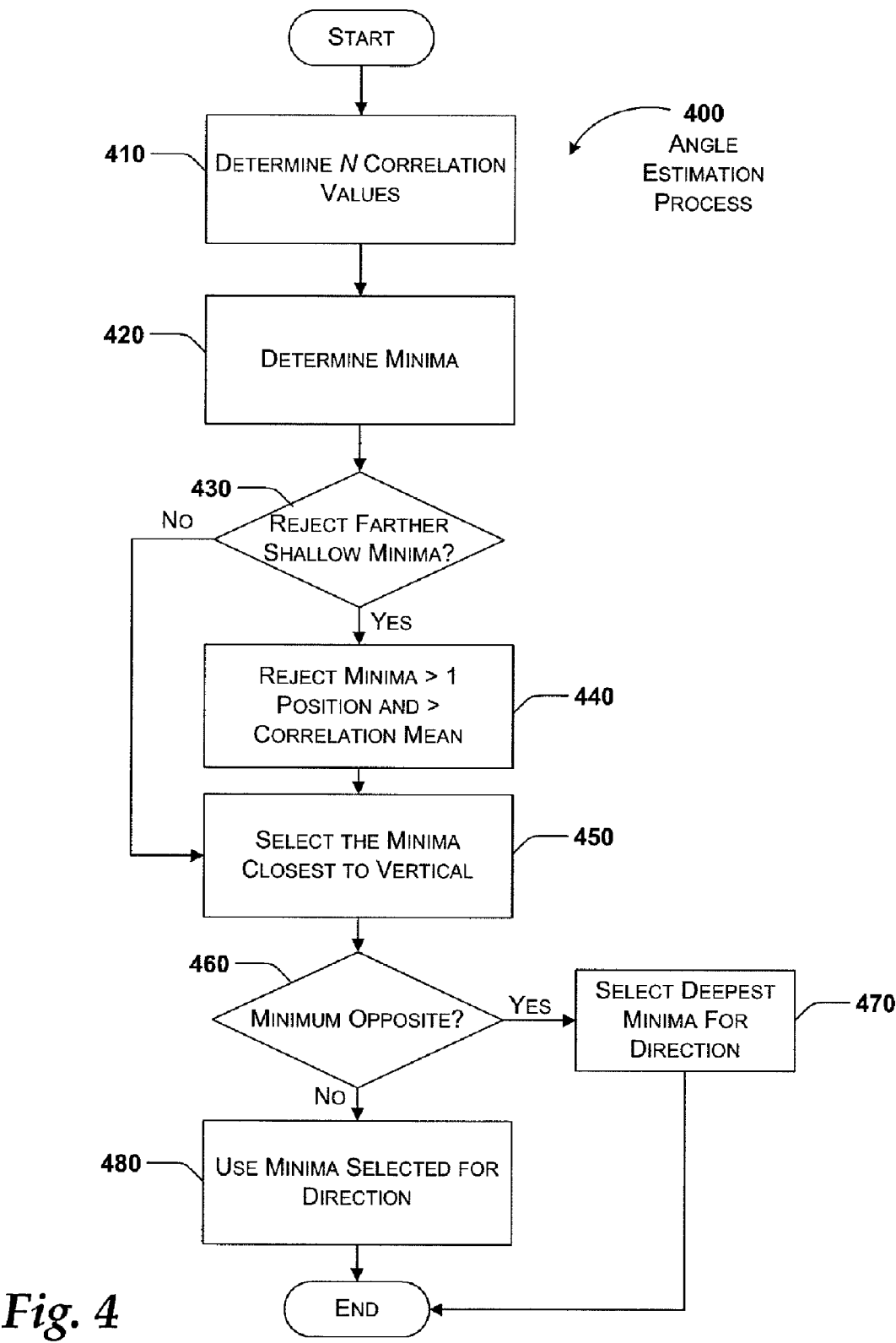
FIG. 4 illustrates a flow diagram of an exemplary process for estimating the vector angle used for interpolating a luminance value for a pixel to be generated.

FIG. 4 illustrates a flow diagram of an exemplary process for estimating the vector angle used for interpolating a luminance value for a pixel to be generated, in accordance with the present disclosure. Processing starts at operation 410 where N correlation values, or correlation measures are provided to the vector angle estimator (104 of FIG. 1). Processing continues at operation 420.

At operation 420, the minima are determined from the correlation values. The minima correspond to the possible vector angles used for interpolating a luminance value for the pixel to be generated. In one embodiment, a graph, or stored representation of a graph, similar to the correlation graph of FIG. 3 is used to determine the minima. Once the minima are determined, processing continues to decision operation 430.

At decision operation 430, a determination may be made to simply reject the minima further from the center that are more shallow than a closer minima, without further processing. If such minima are not rejected, processing advances to operation 450. However, if these minima are rejected, processing continues at operation 440.

Operation 440 rejects any minima over one position away from the center that are also greater than the correlation mean. Accordingly, even though these minima exist, they are not deep enough to be considered as corresponding to selectable vectors for interpolation and are rejected. Once these minima are rejected, processing continues with operation 450.

At operation 450, the minima position that is closest to the vertical position is selected. This selection of the closest minima position occurs whether or not the farther shallow minima were rejected. Once the minima position closest to the vertical position is selected, processing continues with decision operation 460.

At decision operation 460, a determination is made whether a minimum exists on the opposite side the vertical in the correlation graph that is the same distance from the vertical as the minima position selected. If no opposite minimum exists, processing moves to operation 480 where the minima already selected is used to provide the vector angle for interpolation. Once the vector angle is provided, process 400 ends and processing moves onto other tasks such as the interpolation of the luminance value.

In contrast, if an opposite minimum does exist, processing continues at operation 470. At operation 470, the deepest of the minima that are the same distance from the vertical is selected to provide the vector angle for interpolation. Once the vector angle is provided, process 400 ends and processing moves onto other tasks such as the interpolation of the luminance value.

Although the vector direction may be determined according to process 400, a determination is still made whether to use that vector's data for producing the luminance output. A confidence value is assigned to the interpolated result that weights the result, either in favor the luminance values produced by interpolating along the selected vector angle, or in favor of a luminance value produced by vertical interpolation as described above. The confidence value may be determined by a set of heuristics that create an ambiguity measure.

One factor that may assist in generating the ambiguity measure involves a determination of whether the correlation values are very similar for each of the vector angles. If the values are similar and there is not much variation in the correlation profile, then the choice of angle is not to be trusted. Slightly different correlation values may be caused by minor variations in a plain background or noise. Ambiguity associated with low correlation variation ($A_v$) is directly proportional to the ratio of the mean to the variation of the set of correlation values (Corr Set). For large variation in correlation values, the ambiguity is low, as may be seen from the following equation;

$$A_v \alpha \frac{\text{Mean (Corr Set)}}{\text{Var (Corr Set)}} \quad \text{(Eqn 2)}$$

For easier implementation, variation is calculated as follows:

$$\text{Var(Corr Set)} = \text{Mean(Corr Set)} - \text{Min(Corr Set)} \quad \text{(Eqn 3)}$$

Figure 5A:
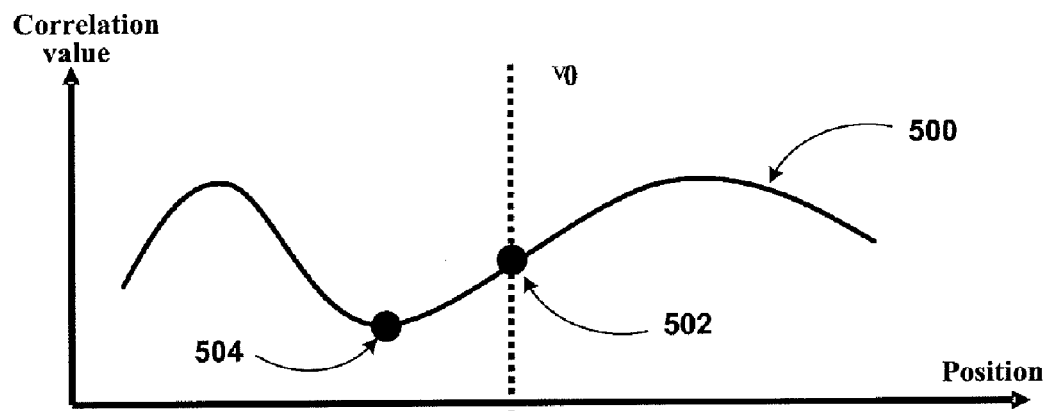
FIG. 5a and FIG. 5b illustrate a correlation graph with a wide correlation minimum and a correlation graph with a narrow correlation minimum, in accordance with the present disclosure.
Figure 5B:
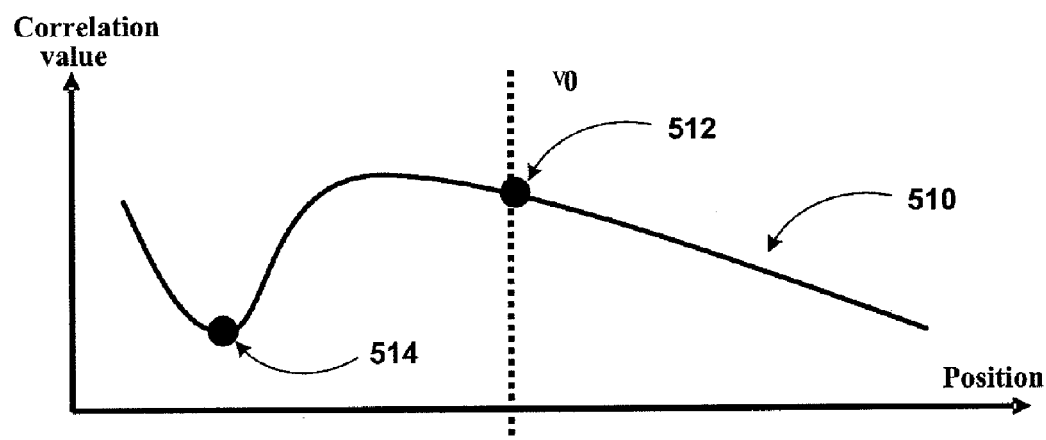

FIG. 5a and FIG. 5b illustrate a correlation graph with a wide correlation minimum and a correlation graph with a narrow correlation minimum, in accordance with the present disclosure. The figures illustrate another factor for the ambiguity measure referred to as a slope direction measure ($A_{slope}$). This ambiguity measure associates the slope of the correlation graph at the vertical position in the window ($v_0$ of FIG. 2) with the slope at the chosen minimum position. If both the slopes are in the same direction (say negative, e.g., FIG. 5a) then the matching slopes imply that the chosen minimum is wide enough to encompass even the vertical position. Stated differently, the vertical position lies in the depression caused by the chosen minimum. The same or similar slopes indicate a wide minimum and ensures that the minimum is not created by spurious noise. Usually, minima caused by noise shows up in correlation graph as sharper depressions in the graph (e.g., FIG. 5b).

The $A_{slope}$ is determined by the exclusive OR between the signs of the two slopes. If the two signs are different, then the vertical position is not contained in the chosen minimum and ambiguity is high.

$$A_{slope} \alpha \text{sign(slope at minimum)}^\wedge \text{sign(slope at vertical position)} \quad \text{(Eqn 4)}$$

After the process of FIG. 4, no other minima are between the chosen minimum and the vertical line ($v_0$) since the closest minimum from the vertical are selected. The shallow minima are rejected in noisy situations. But then, the effect of this particular noisy situation might be to raise the ambiguity flag, in which case, the vertically averaged luminance value gets more weight and any potential "wrong decision" is averted.

Another ambiguity factor involves high pass characteristics ($A_{hpf}$). Since a correlation metric is based on sum of absolute differences, it often does not reflect the frequency content of the window very accurately. If the size of the feature is smaller than the size of the sub-windows used to calculate the correlation value, then the chance of getting false correlation peaks is high. False peaks and valleys and making a wrong decision of the vector angle are recognized by looking at the horizontal high pass characteristic of the pixels in the window.

$$A_{hpf} \alpha \ 0.5 * \text{Magnitude}(HPF_{top\ line}) + 0.5 * \text{Magnitude}(HPF_{bottom\ line}) \quad \text{(Eqn 5)}$$

The ambiguity measure representing the high pass characteristics of the pixel to be estimated is proportional to the average of high pass magnitude of the top and bottom lines. A high magnitude indicates high frequency and therefore unreliable correlation minima positions.

From equations 2, 4 and 5, the three ambiguity measures $A_v$, $A_{slope}$ and $A_{hpf}$ are calculated. Each ambiguity measure has an individual select option. When the select option is 1, the corresponding ambiguity metric is selected for calculating another ambiguity metric (A). When the select option is 0, the corresponding ambiguity metric is not considered for this ambiguity metric calculation. The ambiguity measure (A) is estimated by taking the maximum of all the selected ambiguity metrics. This measure is passed on to the pixel interpolator module and acts as a weighting factor between the estimated interpolation angle and the vertical direction for calculating the luminance value. The measure may be expressed as follows:

$$A = \text{Max}(sel\_A_{hpf} * A_{hpf}, sel\_A_{slope} * A_{slope}, sel\_A_v * A_v) \quad \text{(Eqn 6)}$$

In equation 6, $sel\_A_{hpf}$, $sel\_A_{slope}$ and $sel\_A_v$ are the select enables for the high-pass, slope and variance based ambiguity metrics respectively. The ambiguity measure (A) therefore acts as a blending factor, which is used to blend the interpolated output in the selected direction with the vertically interpolated output, as follows:

$$Y_{out} = (1-A) * Y_{interpolated} + A * Y_{vertically\ interpolated} \quad \text{(Eqn 7)}$$

The vector interpolator combines the ambiguity measure (as a weighting factor) along with the vertical average luminance value and the average luminance value along the selected vector angle. The vector interpolator, therefore, allows for a much more accurate estimation of the luminance for a pixel. Used over the entire de-interlacing or scaling process, the vector interpolator provides for better picture without all of the artifacts associated with other de-interlacing techniques.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for determining a value for a pixel being generated within a window of pixels around the pixel, comprising:
    generating correlation data for the pixel, wherein the correlation reflects a similarity between pixels along a set of vectors passing through the pixel according to a set of angles;
    estimating which vector corresponds to a preferred angle within the set of angles for interpolation of a first interpolated value;
    estimating a second interpolated value that corresponds to vertical vector that is associated with a vertical angles within the set of angles; and
    blending the first interpolated value with the second interpolated value to generate the value for the pixel;
    wherein estimating which vector corresponds to the preferred angle comprises selecting the vector closest in proximity to the vertical vector with a minimum correlation value, wherein low correlation values indicate similarity between regions on opposite ends of each vector across the pixel.

2. The method of claim 1, further comprising determining an ambiguity measure that provides a weighted confidence value for the first interpolated value, and wherein the first interpolated value and the second interpolated value are blended using the ambiguity measure as a blending factor.

3. The method of claim 1, wherein generating correlation data further comprises selecting the window of pixels around the pixel from which the correlation data is generated.

4. The method of claim 3, wherein generating correlation data further comprises summing absolute differences of luminance values of corresponding pixels included in sub-windows along each vector of the set of vectors.

5. The method of claim 1, wherein generating correlation data further comprises generating a correlation graph, wherein the correlation graph includes minima that each correspond to at least one of the vectors within the set of vectors.

6. The method of claim 5, wherein the minima represent low correlation values.

7. The method of claim 1, wherein determining an ambiguity measure further comprises determining a low correlation variation measure.

8. The method of claim 1, wherein determining an ambiguity measure further comprises determining a slope direction measure.

9. The method of claim 1, wherein determining an ambiguity measure further comprises determining high pass characteristics corresponding to the window of pixels around the pixel to be determined.

10. A vector interpolator, comprising:
- a first pipeline for handling and distributing input luminance data;
- a second pipeline for handling and distributing chrominance data;
- a chrominance interpolator coupled to the second pipeline, the chrominance interpolator being arranged to interpolate a chrominance value for a pixel;
- a luminance interpolator coupled to the first pipeline, the luminance interpolator being arranged to interpolate a luminance value for the pixel;
- a correlation accumulator that is coupled to the first pipeline, wherein the correlation accumulator is configured to generate correlation data for the pixel that reflects a similarity between pixels along a set of vectors passing through the pixel according to a set of angles; and
- a vector angle estimator that is coupled to the first pipeline and the correlation accumulator, wherein the vector angle estimator is configured to estimate which vector corresponds to a preferred angle within the set of angles for interpolation of a first interpolated value, wherein the first interpolated value is combinable with an ambiguity measure to produce a final interpolated value for the pixel.

11. The vector interpolator of claim 10, wherein the final interpolated value for the pixel corresponds to the luminance value for the pixel.

12. The vector interpolator of claim 10, wherein the final interpolated value for the pixel corresponds to the chrominance value for the pixel.

13. The vector interpolator of claim 10, wherein at least one of the luminance interpolator and chrominance interpolator is further configured to determine at least one of the following to provide the ambiguity measure: a low correlation variation measure; a slope direction measure; and high pass characteristics corresponding to a window of pixels around the pixel.

14. The vector interpolator of claim 10, wherein at least one of the luminance interpolator and chrominance interpolator is further configured to modify the first interpolated value with the ambiguity measure.

15. The vector interpolator of claim 10, wherein at least one of the luminance interpolator and chrominance interpolator is further configured to blend the first interpolated value with a second interpolated value that corresponds to interpolation along a vector in the set of vectors is associated with a vertical angle within the set of angles and using the ambiguity measure as a blending factor.

16. The vector interpolator of claim 10, wherein the correlation accumulator is further configured to generate a correlation graph, wherein the correlation graph includes minima that each correspond to at least one of the vectors within the set of vectors and represent low correlation values that indicate similarity between regions on opposite ends of each vector across the pixel.

17. The vector interpolator of claim 16, wherein the vector angle estimator is further configured to select a minimum of the minima within close proximity of a vertical vector in the correlation graph as the vector that corresponds to a preferred angle, determine whether another minimum is a same distance from the vertical vector on an opposite side of the vertical vector, and select a deeper one of the minimum as the vector that corresponds to the preferred angle.

18. An apparatus for determining a value for a pixel, comprising:
- means for generating correlation data for the pixel, wherein the correlation reflects a similarity between pixels along a set of vectors passing through the pixel according to a set of angles;
- means for estimating which vector corresponds to a preferred angle within the set of angles for interpolation of a first interpolated value; and
- means for determining an ambiguity measure that provides a weighted confidence value for the first interpolated value and blending according to the ambiguity measure the first interpolated value with a second interpolated value to generate the value for the pixel;
- wherein the means for estimating which vector corresponds to the preferred angle comprises means for selecting a vector closest in proximity to the vertical vector with a minimum correlation value, wherein low correlation values indicate similarity between regions on opposite ends of each vector across the pixel.

* * * * *